Sept. 17, 1946.  W. F. GROENE ET AL  2,407,778
TAPER TURNING APPARATUS
Filed Feb. 4, 1943  5 Sheets-Sheet 1
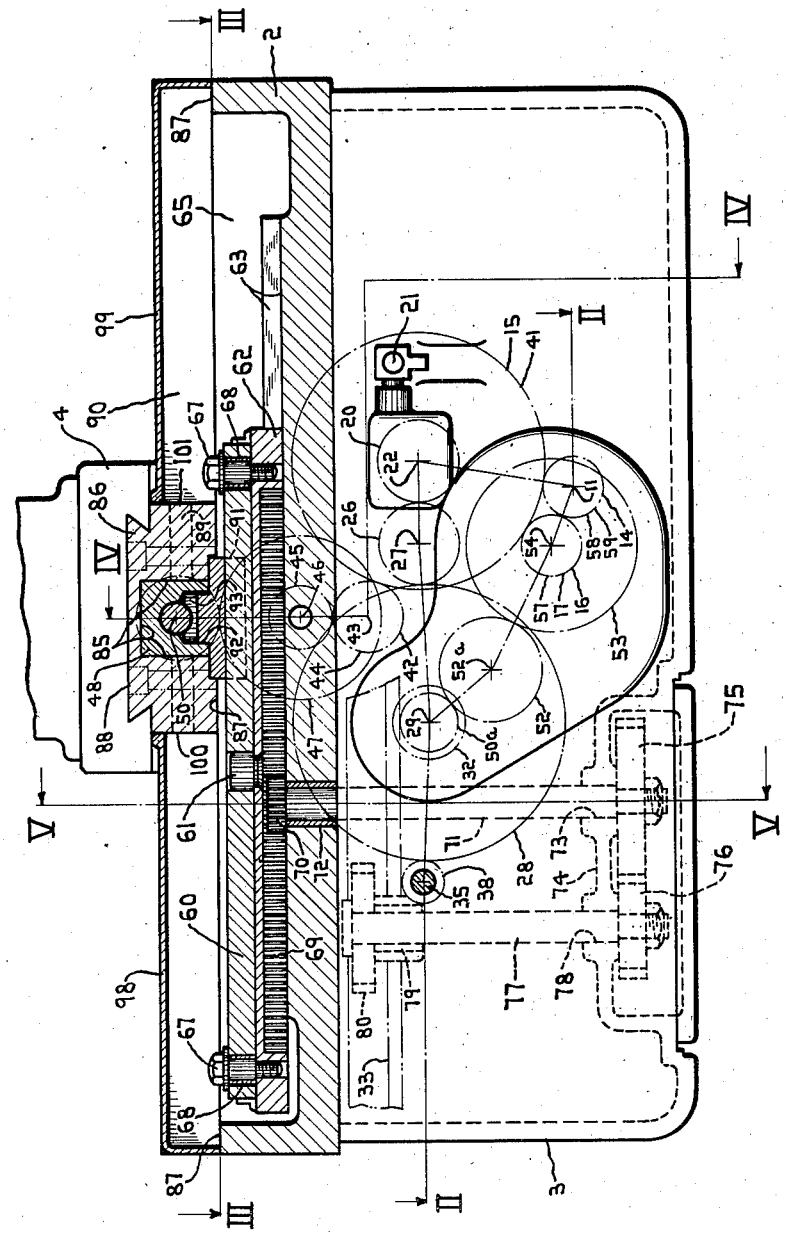
FIG.I
INVENTORS.
WILLIAM F. GROENE
HARRY C. KEMPER
BY Willard L. Groene
ATTORNEY

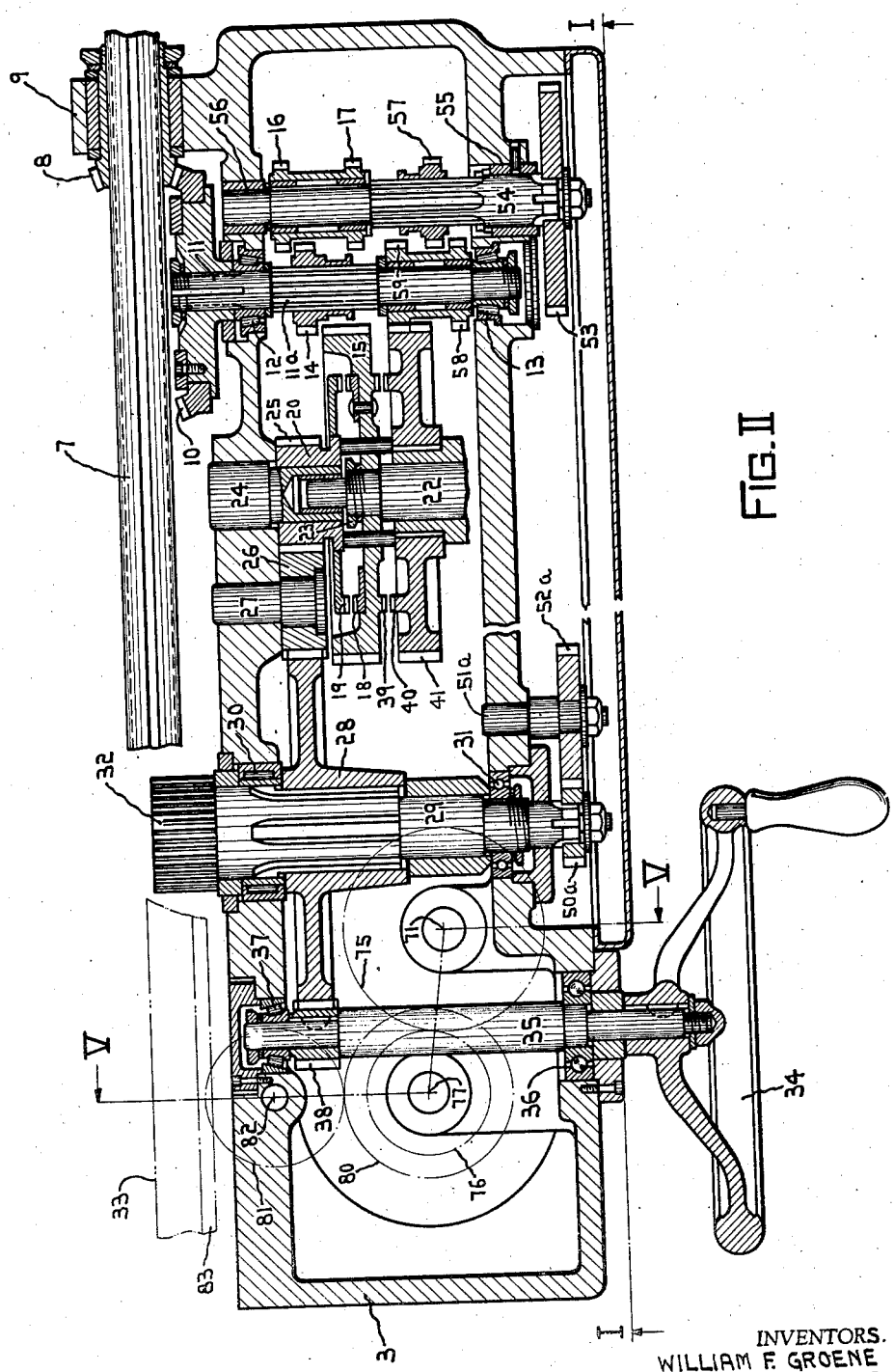

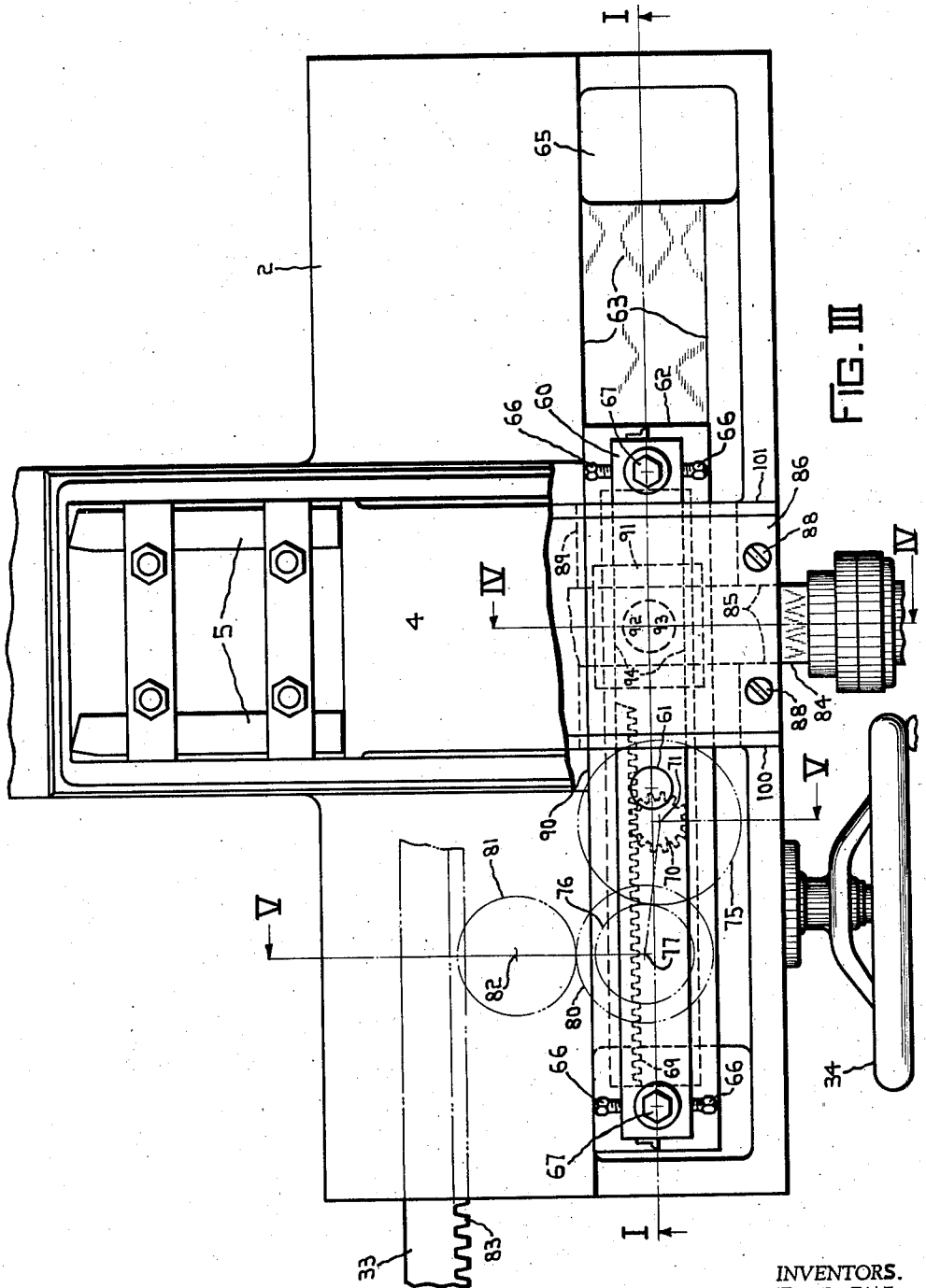

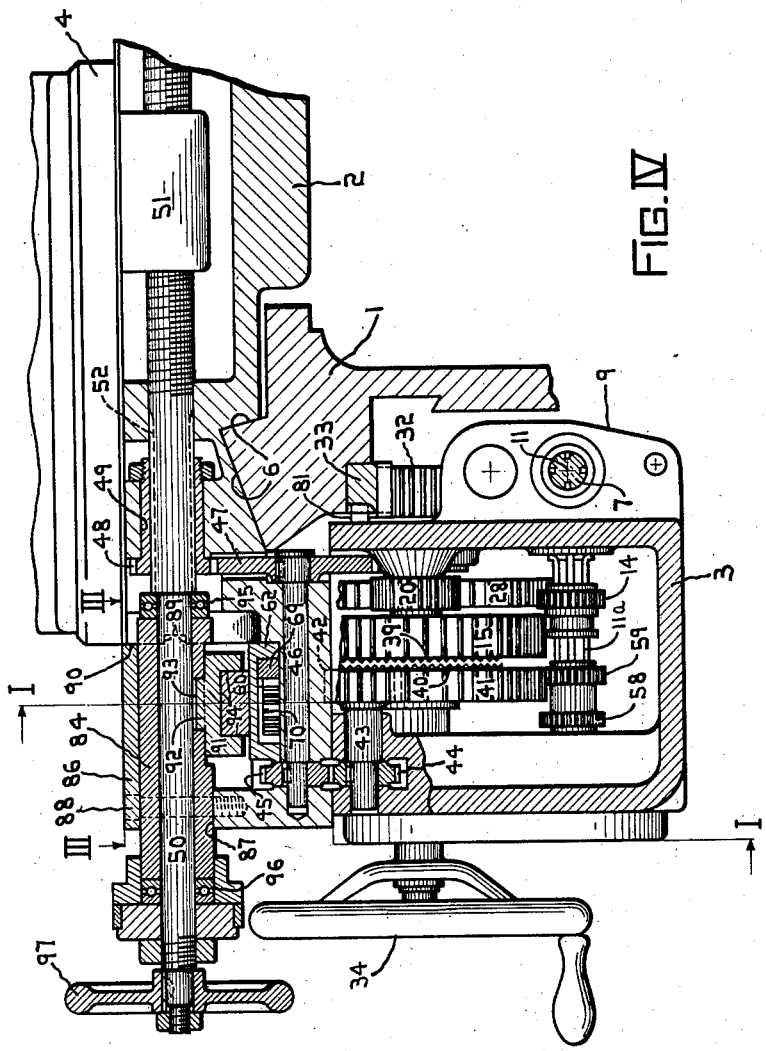

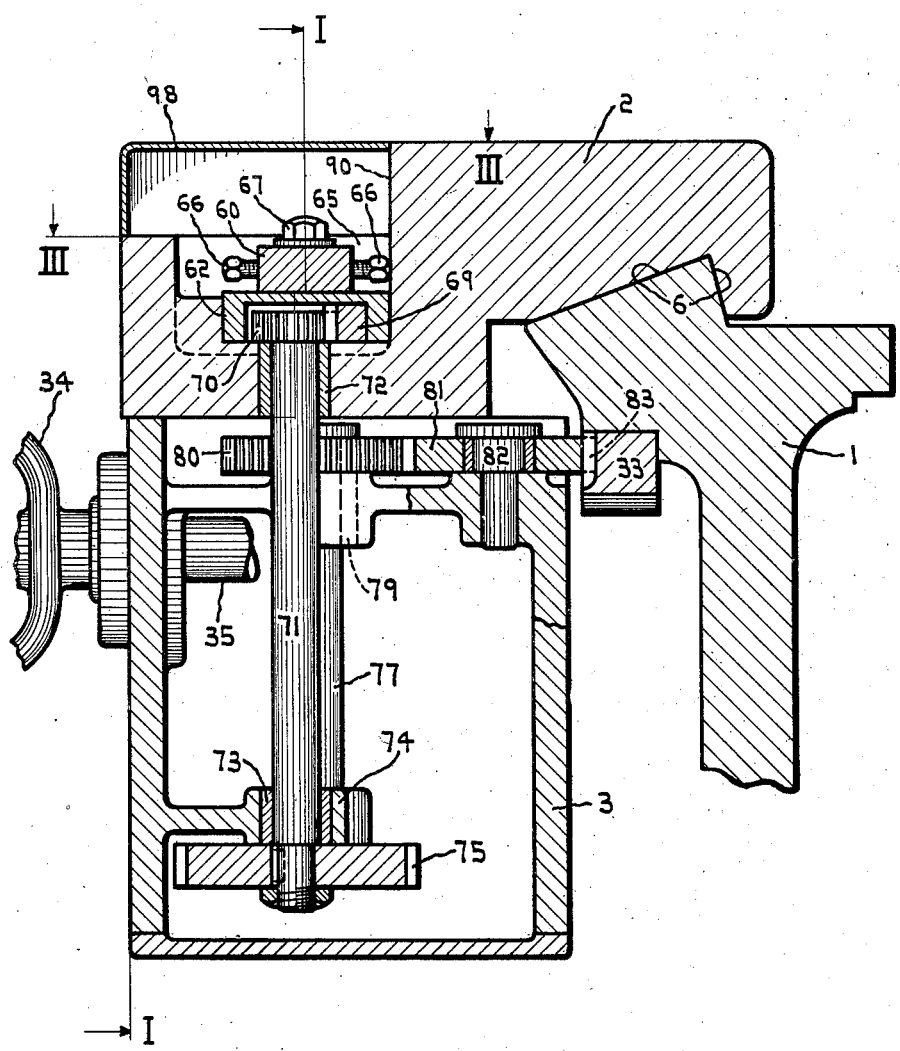
FIG.V

Patented Sept. 17, 1946

2,407,778

UNITED STATES PATENT OFFICE 2,407,778

TAPER TURNING APPARATUS

William F. Groene, Cincinnati, and Harry C. Kemper, Goshen Township, Clermont County, Ohio, assignors to The R. K. Le Blond Machine Tool Company, Cincinnati, Ohio, a corporation of Delaware Application February 4, 1943, Serial No. 474,732

1 Claim. (Cl. 82—22)

This invention pertains to taper turning apparatus and is particularly related to mechanism associated with machine tools and specifically to lathe apron, carriage, and tool slide apparatus of lathes.

The object of this invention is to provide in a lathe having a carriage, cross slide, and an apron, mechanism for effecting movement of the cutting tool on the cross slide of the lathe for taper cutting operations on work held in the lathe. One of the chief objects of this invention is to provide an arrangement in such a lathe mechanism wherein part of the taper cutting action is effected by means of the simultaneous operation of the cross slide and the carriage longitudinally of the bed of the lathe while at the same time to provide a taper bar operating at a differential rate of movement relative to the movement of the lathe carriage to effect any variety and steepness of taper desired to be cut on the work in the lathe.

More specifically it is an object in such an arrangement of the simultaneous actuation of the cross slide and carriage and the differential operation of the taper attachment, to provide in conjunction with both of these sets of mechanisms, change gearing for operating the cross slide and carriage at different rates with respect to each other and to provide change gearing in connection with the taper attachment bar for rendering different rates of motion of the taper bar with respect to the carriage motion. It, of course, is desired to have both of said change gear mechanisms driven by appropriate transmission gearing in the lathe apron associated with this taper cutting mechanism.

Heretofore, there have been taper cutting apparatus in which the apron had a fixed ratio of motion of cross slide movement to carriage travel along the bed and in conjunction with this arrangement a regular taper attachment bar was used which had no differential motion with respect to the lathe carriage movement. Another arrangement formerly used for taper cutting comprised change gears between the cross slide actuating mechanism and the longitudinal carriage feeding motion to effect a wide range of taper cutting possible with this type of change gear arrangement. With this latter type of change gear arrangement, however, there was no taper attachment or taper bar utilized. There have also been taper cutting arrangements in which the relationship of the cross slide to the carriage travel remained constant while a differential taper attachment was provided which would move at differential rates of movement with respect to the carriage travel. All of these above arrangements have limited application and scope of use in that they are unable to provide a complete range of tapers desired within the limits of a commercially practical and efficient transmission mechanism.

It is therefore the object of the present invention to incorporate in a lathe feeding mechanism, a simplified arrangement of parts which are capable of a wide range of use. In this connection applicants have provided an arrangement in which both the carriage and cross slide may be operated simultaneously at different rates of relative speed by effecting a change gear drive transmission between the carriage and cross slide actuating movement; and in conjunction with this arrangement it is also an object to provide a differential taper bar which may be actuated at a different series of relative rates of differential movement for the taper bar with respect to the movement of the carriage along the bed of the lathe. It is a further object to provide in this lathe apron mechanism, a transmission gearing capable of simultaneously actuating both of said change gear transmissions in association with their respective tool slide, carriage, and the taper bar.

A still further object of this invention is to construct this mechanism of compact design completely enclosed from chips or foreign matter which might fall upon it from the actuation of the cutting tools on the work piece. In this respect, applicants propose to mount a taper attachment bar in the front of the carriage of the lathe and to totally enclose said taper bar by appropriate means so as to completely eliminate any possibilities of chips or other foreign matter coming in contact with the taper bar as in former types of taper bar construction.

Further features and advantages of this invention will appear from the detailed description of the drawings in which:

Figure I is a front elevation of the lathe apron and carriage mechanism partly in section on the line I—I of Figures II, III, IV, and V showing the change gear transmission mechanisms for the simultaneous operation of the cross slide and longitudinal movement for the lathe carriage and also the change gear transmission gearing for actuating the taper bar in differential movement relative to the longitudinal movement of the carriage.

Figure II is a diagrammatic sectional view of the apron transmission gearing mechanism shown on the line II—II of Figure I.

Figure III is a fragmentary plan view of the lathe carriage and cross slide mechanism partly in section on the lines III—III of Figures I, IV, and V.

Figure IV is a fragmentary transverse section through the cross slide and apron mechanism shown on the lines IV—IV in Figures I and III.

Figure V is a fragmentary transverse sectional view through the lathe carriage and apron mechanism on the line V—V of Figures I, II, and III.

This invention is shown applied to a lathe having a bed 1 upon which is longitudinally slidably mounted a carriage 2 and to which is fixed the apron or apron housing 3 and on top of which is mounted the cross slide 4 carrying the cutting tools 5 of the lathe. The carriage 2 is moved longitudinally of the ways 6 of the bed 1 by power from the lathe headstock transmission (not shown) which drives the conventional feed rod 7, Figure II, which passes drivingly through the splined bore of the bevel gear 8 journaled against axial movement in the boss 9 of the apron housing 3. This bevel gear 8 in turn drives a bevel gear 10 fixed on the input shaft 11 journaled in the apron housing 3 on appropriate bearings 12 and 13. On the splined portions 11a of this shaft 11 is slidably mounted the driving pinion 14 which may be alternately slid into engagement with the clutch gear 15 or the gear 16 of the compound gear 16—17. The gear 17 of the double gear 16—17 is at all times in engagement with the gear 15 so that power from the shaft 11 may be transmitted directly to the gear 15 from the gear 14 or in the reverse direction to the gear 14, the gear 16—17 into the gear 15 to effect driving of the gear 15 in either direction. Appropriate handle shifting means (not shown) may be employed for axially sliding the gear 14 on the splined portion of the shaft 11.

The gear 15 may be moved axially to engage its clutch teeth 18 with the clutch teeth 19 formed on the clutch pinion gear member 20 by manipulating the feed start and stop lever 21, Figure I, which causes axial sliding of the shaft 22 to which the gear 15 is fixed by appropriate lock nut 23 in a conventional manner. The clutch gear 20 is journalled on a stud 24 fixed in the apron housing 3 and has gear teeth 25 which drive the idler gear 26 journaled on the stud 27 and which idler gear 26 in turn is in engagement with the face gear 28 fixed on the rack pinion shaft 29 journaled on appropriate bearings 30 and 31 in the apron housing 3. A suitable rack pinion 32 is cut on the outer end of the rack pinion shaft 29 and engages in the rack 33, Figures IV and V, fixed to the bed 1 of the lathe.

Thus with the clutch teeth 18 and 19 in engagement, power may be transmitted from the rod 7 to the rack pinion 32 to rotate it in either direction to effect the longitudinal feeding motion of the carriage along the bed of the lathe. An appropriate hand wheel 34, Figure II, fixed on the hand wheel shaft 35 journaled on suitable bearings 36 and 37 in the apron housing 3 has a pinion 38 fixed on the shaft 35 in engagement with the face gear 28 so that when the clutch teeth 18 and 19 are disengaged the carriage may be manipulated longitudinally of the bed manually by means of the hand wheel 34. When the clutch teeth 39 of the clutch gear 15 are engaged with the clutch teeth 40 of the clutch gear 41 power may be transmitted from the feed rod 7 directly to the cross slide 4 for actuating it in cross slide movement independent of the longitudinal feeding of the carriage along the bed. When the clutch members 39 and 40 are so engaged power is transmitted from the gear 15 to the gear 41 which drives a pinion 42 fixed on the shaft 43, Figure IV, journaled in the apron housing 3 and which has fixed on it a pinion 44 which in turn drives a pinion 45 fixed on a shaft 46 also journaled in the carriage 2 of the lathe. On the outer end of this shaft 46 is a gear 47 which in turn drives a gear 48 journaled in a suitable bearing 49 against axial movement in the carriage 2 of the lathe. The cross feed screw 50 operating in the cross feed nut 51 attached to the bottom of the cross slide 4 has a splined portion 52 which slidably engages in a splined bore of the gear 48 so as to be at all times rotated by the gear 48 though free to move in and out axially in the bore of the gear 48.

The cross slide 4 and the carriage 2 may be operated simultaneously in their respective movements through the medium of a series of change gears comprising a change gear 50a, Figure II, mounted on the outer end of the rack pinion shaft 29 which in turn drives a gear 52a on a stud 51a in the apron housing 3, which is in driving engagement with a change gear 53 carried on the shaft 54 journaled in suitable bearings 55 and 56 in the apron housing 3. Under these conditions of the simultaneous driving of the cross slide and longitudinal movement of the carriage the clutch members 18 and 19 are continuously engaged so that the rack pinion 32 is operated in the conventional fashion for longitudinal movement of the carriage and apron along the bed while rotation of the cross feed screw 50 is effected through the medium of the change gears 50a, 52a, and 53 and the shaft 54 from which power is taken off by means of the sliding pinion 57 which may be alternately engaged with the gear 58 of the double gear 58—59 or directly with the gear 59 of said double gear for effecting the connection of power from the gear 57 to the gear 41 in either direction. The gear 41, of course, is connected to the gear 48 for rotating the cross feed screw as described above so that the cross feed and longitudinal movement of the lathe carriage and cross slide may be simultaneously effected. By selecting various different change gears in place of the gears 50a, 52a, and 53, it is possible to effect a large variety of relative rates of actuation of the cross slide and carriage in their respective feeding movements to in this way effect different types of fixed sets of tapers to be cut by the simultaneous operation of the cross slide and the carriage.

In order to effect any range of tapers in between the various predetermined selection of tapers by the simultaneous movement of the cross slide and carriage through the medium of the change gears 50a, 52a, and 53 a taper bar 60 is provided which is carried on a pivot pin 61 fixed in the taper bar slide 62 which moves in the guide ways 63 formed in the taper bar cavity 65 in the top centers of the front wing of the lathe carriage 2. This taper bar 60 may be set at any desirable angle within its range by means of the adjusting screws 66 and locked in place by suitable clamping screws 67 passing through clearance hole 68 formed in the taper bar 60 and the screw 67 being threaded into the taper bar slide 62.

On this taper bar slide 62 is a rack 69 which is engaged by a pinion 70, Figure V, formed on the shaft 71 journaled at its upper end in a bearing 72 in the carriage 2 and at its lower end in a bearing 73 carried in a lug 74 of the apron housing 3. On the lower end of the shaft 71 is a change gear 75 which may be connected to a mating change gear 76 fixed on the shaft 77, Figure I, which is appropriately journaled in suitable bearings 78 and 79 in the apron housing 3. On the upper end of this shaft 77 is fixed a gear 80 which in turn drives an idler gear 81 journalled on a stud 82 fixed in the apron housing 3 and which idler gear 81 in turn engages rack teeth 83 cut in the side of the rack 33. Thus it can be seen that as the carriage 2 and apron 3 move longitudinally of the bed 1 the rack teeth 83 will cause the idler gear 81 to rotate on its stud 82 and through the driving transmission just described to rotate the pinion 79 and thereby move the taper bar slide 69 in the guide ways 63. By appropriately selecting the change gearing comprising the gear 75—76 various rates of relative differential motion of the taper bar carriage 69 with respect to the carriage and with respect to the bed of the lathe may be effected and, coupled with the angular adjustment for the taper bar 60, a large variety of infinitely variable tapers may be provided and taken in conjunction with the transmission mechanism just described for the simultaneous movement of the carriage cross slide, an infinite range of tapers may be effected.

The modification of the movement of the cross slide by the taper bar is effected by the axial sliding of the cross feed screw 50 while it is being rotated simultaneously with the movement of the carriage longitudinally of the bed. This mechanism comprises a journal block 84 which is axially slidable in guideways 85 formed in the block 86 appropriately fixed on the surface 87 of the carriage 2 by means of the screws 88 and locked in position at the rear by a suitable tongue 89 engaging in a key way in the rear face 90 formed in the carriage 2. This journal block 84 thus may be slid axially by means of the shoe 91 having a trunion 92 fitting in a bore 93 formed in the bottom of the block 84 and which shoe 91 has surfaces 94 which fit around the taper bar 60 so that for any position of angular setting of the taper bar 60, the shoe will follow this bar and, as the bar is moved along the length of the bed on the guideways 63, the block 84 will be moved in and out to push or pull the cross feed screw through the medium of the thrust bearings 95 and 96 to effect the axial movement of the cross feed screw 50 while still permitting its rotation by the gear 49. Manual rotation of the cross feed screw may be effected at all times by the hand wheel 97 appropriately attached to the outer end of the cross feed screw 50.

One of the unique features of this arrangement of the taper bar 60 in the front wing of the carriage is that it may be totally enclosed from exposure to any dirt or chips whatsoever discharged from the work and cutting tools. In order to accomplish this result, appropriate covers 98 and 99 are nicely fitted against the faces 100 and 101 of the block 86 and against the rear face 90 and the bottom face 87 of the carriage to in this way insure a tight closure for the entire taper attachment mechanism with no exposed portions whatever and no moving parts at any point outside the carriage and apron mechanism which could become covered with foreign matter from the work and tools.

Summarizing the essential functions of this taper turning apparatus, it will be noted that a longitudinal movement of the carriage may be independently effected by applying power from the feed rod 7 through the input shaft 11 to the clutch gear 15, at which time the clutch teeth 18 and 19 are engaged so as to transmit this power through the pinion 25 and the idler gear 26 to the face gear 28 on the rack pinion shaft 29 and thus through the medium of the rack pinion 32 to the rack 33 on the bed of the lathe. When it is desired to operate the cross slide independently, power is transmitted from the feed rod 7 to the input shaft 11 and the clutch gear 15 at which time the clutch teeth 39 and 40 are engaged and power is taken off the gear 41 and transmitted to the gear 42—44 and 45—47 to the gear 48 for rotating the cross feed screw 50 in its nut 51 for actuating the cross slide 4 as best seen in Figure IV. When it is desired to operate the cross slide and longitudinal carriage motion simultaneously the clutch teeth 18—19 are kept in constant engagement. Power is then transmitted from the feed rod 7 to the input shaft 11 to the gear 15 to actuate the longitudinal feed rack pinion 32 as described. At the same time power is also taken off the rack pinion shaft 29 and is transmitted through the change gears 50a, 52a, and 53 to the shaft 54 where power is transmitted through the gear 57 either through gear 58—59 or gear 59 to the gear 41 for rotating the cross feed screw 50. Thus under these conditions both the pinion 32 and the cross feed screw 50 simultaneously operate. Also by selecting various changes for the gears 50a, 52a, and 53 different rates of relative movement of the cross slide 4 and the carriage 3 along the bed may be effected giving definite predetermined fixed steps of tapers for the cutting tool 5 mounted on the cross slide 4.

In order to further modify the various predetermined steps of tapers effected by the simultaneous operation of the cross slide and carriage as above described, infinite variations are effected through the medium of the taper bar 60 which may be operated at a series of predetermined different rates of motion through the medium of the gearing comprising the pinion 81 operating in the rack teeth 83 of the rack 33 through the gears 80, 76, 75, and 79 operating in the rack 69 in the taper bar slide 62. Adjustment of angularity of the taper bar 60 also further modifies the infinite variety of positions obtainable for any desired series of tapers to be cut by this apparatus.

What we claim is:

In a lathe tool feeding mechanism, a bed, a carriage on said bed, a cross slide on said carriage including a cross feed screw, an apron on said carriage, a feed reverse transmission in said apron actuable from a source of feed power of said lathe, a cross and longitudinal feed selector connected to said feed reverse transmission, and taper control mechanism in said apron including the combination of a change gear transmission, means for connecting said transmission to rotate the actuating cross feed screw and move said cross slide, means for connecting said transmission to said cross and longitudinal feed selector when longitudinal feed of the carriage is being effected, a taper attachment mounted in the carriage having a taper bar, means operably connected to the cross feed screw and slidable along said taper bar for transmitting motion to said cross feed screw in accordance with the angle of said taper bar for axial reciprocation of said cross feed screw, and a change gear transmission in said apron adapted to be driven from a rack fixed on said bed by the movement of said carriage thereon and connected to said taper bar for actuation thereof to vary the effective motion transmitted thereby to the cross feed screw.

WILLIAM F. GROENE.
HARRY C. KEMPER.